J. BJORNLIE.
TIRE TOOL.
APPLICATION FILED JAN. 25, 1919.
1,343,893.
Patented June 22, 1920.
2 SHEETS—SHEET 1.
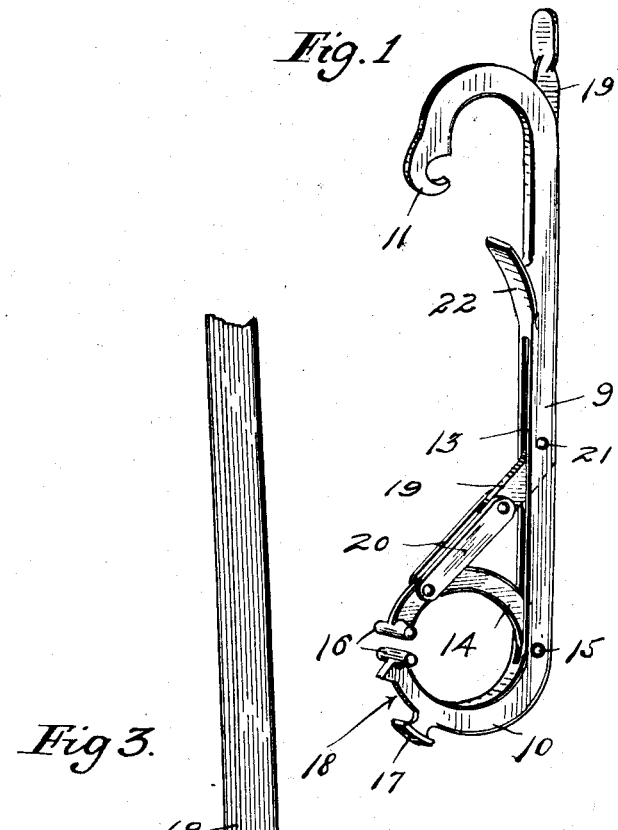
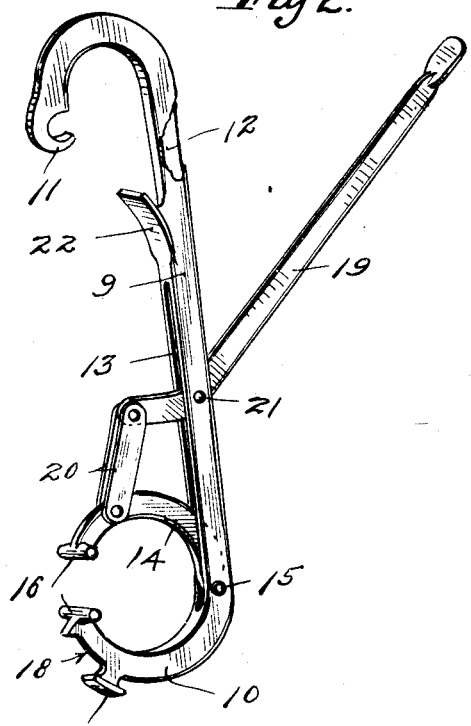
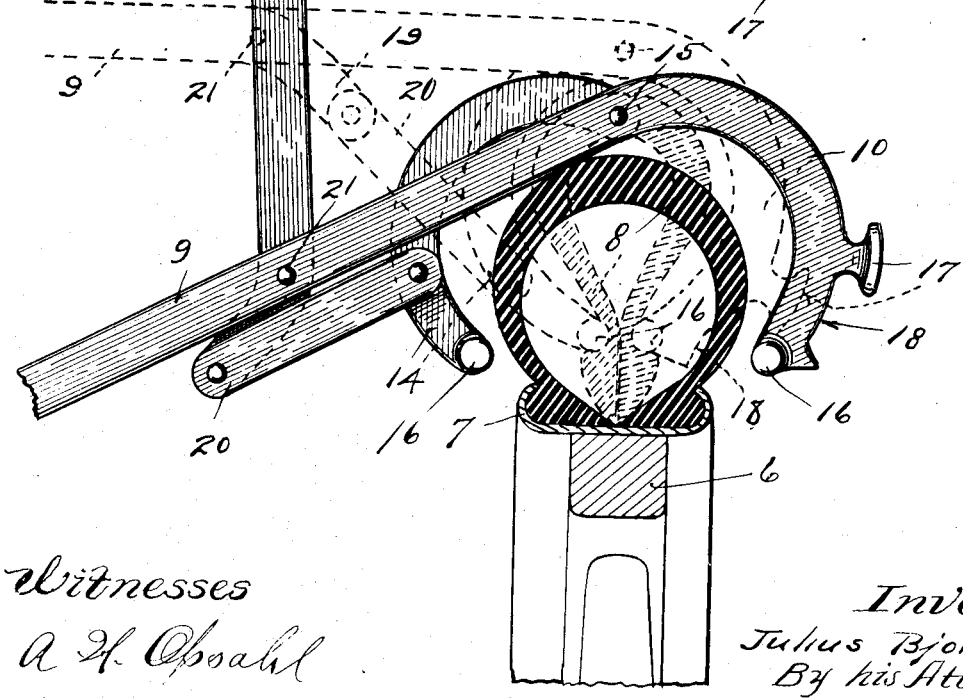
Witnesses
A. H. Opsahl
H. D. Kilgore
Inventor
Julius Bjornlie
By his Attorneys
Williamson & Merchant

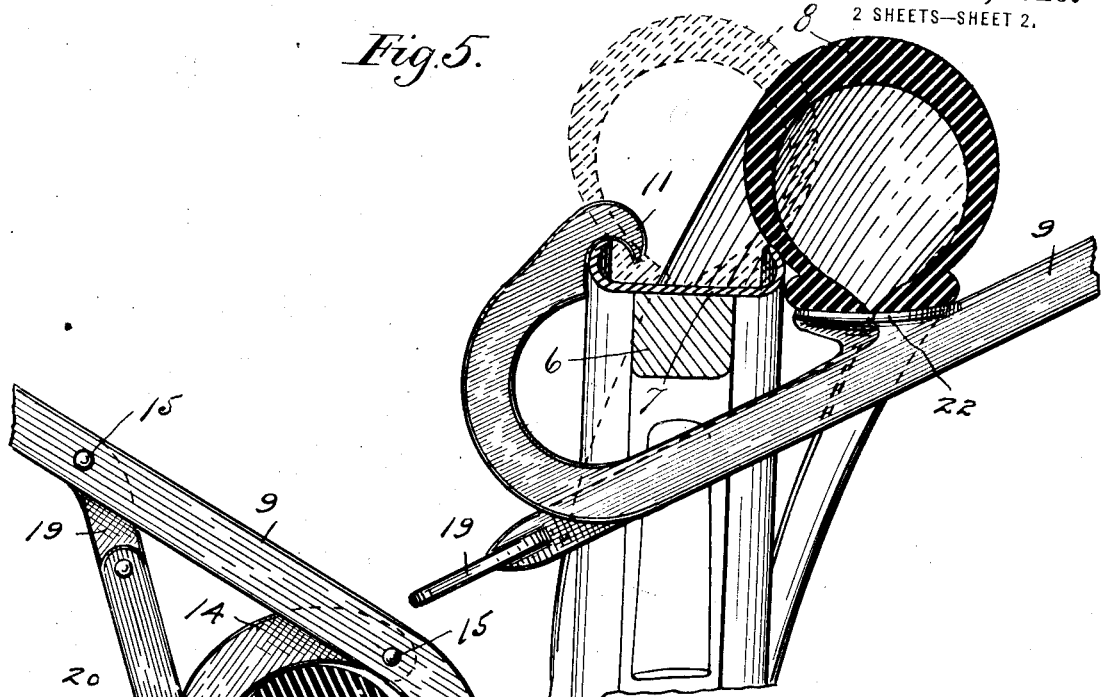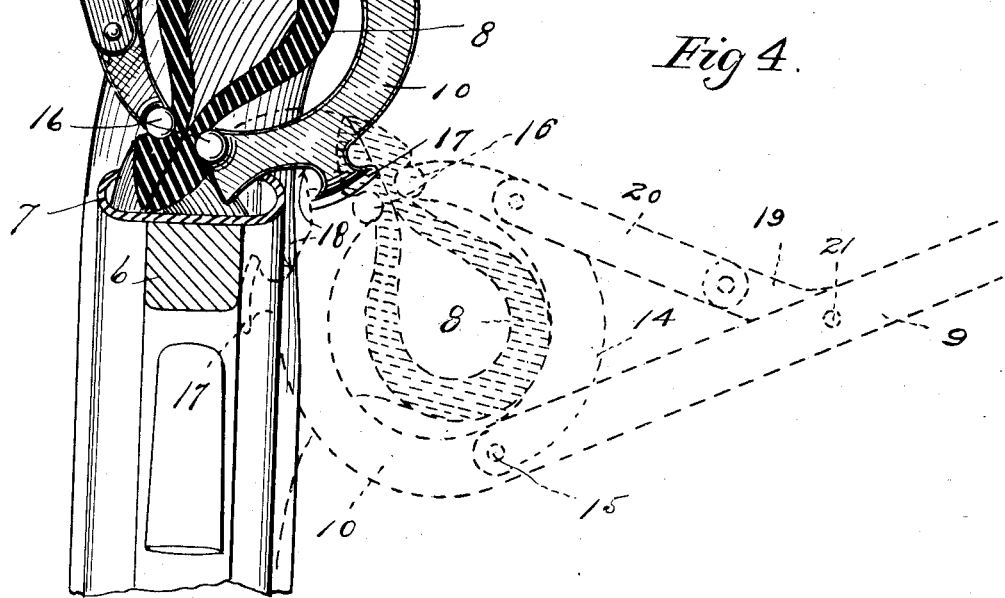

UNITED STATES PATENT OFFICE.

JULIUS BJORNLIE, OF WATERTOWN, SOUTH DAKOTA, ASSIGNOR TO BJORNLIE MANUFACTURING COMPANY, OF WATERTOWN, SOUTH DAKOTA, A CORPORATION OF SOUTH DAKOTA.

TIRE-TOOL.

1,343,893.  Specification of Letters Patent.  Patented June 22, 1920.

Application filed January 25, 1919. Serial No. 273,050.

*To all whom it may concern:*

Be it known that I, JULIUS BJORNLIE, a citizen of the United States, residing at Watertown, in the county of Codington and State of South Dakota, have invented certain new and useful Improvements in Tire-Tools; and I do hereby declare the following to be a full, clear, and exact description of the invention, such as will enable others skilled in the art to which it appertains to make and use the same.

My present invention has for its object to provide a highly efficient tire tool for use in applying pneumatic tire casings to wheel rims and removing the same therefrom.

To the above end, the invention consists of the novel devices and combinations of devices hereinafter described and defined in the claims.

In the accompanying drawings, which illustrate the invention, like characters indicate like parts throughout the several views.

Referring to the drawings,

Figures 1 and 2 are perspective views showing the improved tire tool in closed and open positions, respectively;

Fig. 3 is a fragmentary view, partly in elevation and partly in section, illustrating the tool in different positions by means of full and broken lines, as used in removing a tire casing from a wheel rim;

Fig. 4 is a view corresponding to Fig. 3, but illustrating further steps in the removal of the tire casing from the wheel rim; and Fig. 5 is a view corresponding to Figs. 3 and 4, but illustrating the tool as used in replacing a tire casing on a wheel rim.

The numeral 6 indicates a wheel felly, having secured thereto a wheel rim 7 on which is mounted a pneumatic tire casing 8.

The improved tire tool includes a flat bar 9 having on one of its ends a fixed jaw 10 and on its other end a wheel rim-engaging hook 11. Both the fixed jaw 10 and the hook 11 extend on the same side of the bar 9 and project toward each other. In the outer edge of the bar 9, is formed a channel 12 and in the bottom of said channel is a slot 13. Coöperating with the fixed jaw 10, is a movable jaw 14, which extends through the slot 13, into the channel 12, and is pivoted at 15 to the bar 9. Both jaws 10 and 14 have on their free ends laterally elongated bearing heads 16.

Formed on the outer edge of the jaw 14, is a fulcrum lug 17 and between said lug and the respective head 16, is a fulcrum seat 18. The movable jaw 14 is operated by a lever 19 connected thereto, as shown, by a pair of laterally spaced links 20. This lever 19 is inserted through the channel 12 and slot 13 and intermediately pivoted at 21 to the bar 9. The short end of the lever 19 is pivotally connected to the intermediate portion of the jaws 14 by the links 20.

When the movable jaw 14 is closed by the lever 19, said lever lies within the channel 12, as shown in Fig. 1, and it is important to note that in this position of the movable jaw 14, the pivotal connection between the said lever and the links 20, is slightly beyond a dead center, and thereby locks said jaw in a closed position and the lever in the channel 12. It is also important to note that the heads 16 do not quite meet when the jaws 10 and 14 are closed, for a purpose that will presently appear. On the inner edge of the bar 9 and projecting toward the wheel rim-engaging hook 11, is a tire-supporting shoulder 22.

In removing the tire casing 8 from the wheel rim 7, the first step is to apply the tool, as shown by full lines in Fig. 3. In this position of the tool, the jaws thereof embrace the casing with the heads thereof positioned to engage opposite sides of said casing just above the rim 7, when said jaws are closed. The second step is to draw the lever 19 toward the bar 9 and force the same into the channel 12. To close the jaws 10 and 14 and thereby squeeze or press the embraced sides of the casing together to withdraw the clencher beads of the casing from the rim and into a position, as indicated by broken lines in Fig. 3. In this position of the tool, the pivotal connection between the lever 19 and the links 20 is beyond a dead center, thus locking the jaws in a closed position around the casing, the distance between the heads 16 being sufficient to receive therebetween the walls of the casing, when the jaws are closed. It will thus be seen that the operator does not have to hold the lever in an operative position when the jaws are closed, thereby leaving his hands free to manipulate the tool. The leverage between the jaw 14 and lever 19 is such that the action in closing the movable jaw to withdraw the clencher beads of the casing from the rim is extremely easy.

A further step in removing the casing 8 from the rim 7 is to draw the bar 9 toward the operator, and thereby bring the fulcrum seat 18 onto the adjacent circumferential edge of the rim, as shown by full lines in Fig. 4. A further downward pull on the bar 9 will carry the fulcrum lug 17 into engagement with the adjacent side of the felly 6, as indicated by broken lines in Fig. 4. Obviously, the seat 18 and lug 17 afford shifting fulcrums for the tool. During this last movement of the tool, the casing is sufficiently stripped from the rim to permit the balance thereof to be removed by hand.

To replace the casing 8 on the rim 7 said casing is first placed on the rim by hand as far as it will go. The tool is then inserted between certain spokes of the wheel and the hook 11 interlocked with the opposite circumferential edge of the rim from which the operator is working as shown by full lines in Fig. 5. The bar 9 may then be lifted to carry the shoulder 22 into contact with the beaded edges of the casing 8 as shown by full lines in Fig. 5. With the casing thus resting on the shoulder 22 and the hook 11 acting as a fulcrum for the tool, the bar 9 is then further lifted to carry the engaged portion of the casing above the rim 7. A still further lifting movement of the tool will cause the engaged portion of the casing to slide from the shoulder 22, as the stretching of the casing is increased by the lifting of the tool, and into position on the rim, as shown by broken lines in Fig. 5.

What I claim is:—

1. A tire tool comprising a pair of substantially semi-circular relatively fixed and movable jaws pivotally connected at one of their ends for opening and closing movement, an operating bar rigidly secured to the pivoted end of said fixed jaw and extending substantially tangentially therefrom, a lever intermediately fulcrumed to the operating bar and having its inner end offset toward the free end of the movable jaw, and a link pivotally connecting the movable jaw to the offset end of the lever.

2. A tire tool comprising a pair of substantially semi-circular relatively fixed and movable jaws pivotally connected at one of their ends for opening and closing movement, an operating bar rigidly secured to the pivoted end of said fixed jaw and extending substantially tangentially therefrom, a lever intermediately fulcrumed to the operating bar and having its inner end offset toward the free end of the movable jaw, a link pivotally connecting the movable jaw to the offset end of the lever, and a fulcrum lug on the movable jaw in the vicinity of its free end.

3. A tire tool comprising a bar having a fixed jaw, a channel in its outer edge and a slot in the bottom of said channel, a movable jaw inserted in said slot and pivoted to the bar, a lever inserted through said slot and intermediately pivoted to the bar, the long end of the lever arranged to be folded into said channel, and a link connection between the short end of the lever and the movable jaw.

In testimony whereof I affix my signature in presence of two witnesses.

JULIUS BJORNLIE.

Witnesses:
CLARA DEMAREST,
HARRY D. KILGORE.